(12) United States Patent
Murayama

(10) Patent No.: US 9,695,346 B2
(45) Date of Patent: Jul. 4, 2017

(54) ADHESIVE FOR FLOOR STRUCTURE

(71) Applicant: Sekisui Fuller Company, Ltd., Tokyo (JP)

(72) Inventor: Yukihiko Murayama, Shiga (JP)

(73) Assignee: SEKISUI FULLER COMPANY, LTD., Tokyo (JP)

( * ) Notice: Subject to any disclaimer, the term of this patent is extended or adjusted under 35 U.S.C. 154(b) by 0 days.

(21) Appl. No.: 14/435,892

(22) PCT Filed: Sep. 26, 2013

(86) PCT No.: PCT/JP2013/076125
§ 371 (c)(1),
(2) Date: Apr. 15, 2015

(87) PCT Pub. No.: WO2014/065076
PCT Pub. Date: May 1, 2014

(65) Prior Publication Data
US 2015/0337184 A1 Nov. 26, 2015

(30) Foreign Application Priority Data

Oct. 22, 2012 (JP) .................................. 2012-233131
Jan. 23, 2013 (JP) .................................. 2013-010364

(51) Int. Cl.
| C08K 7/28 | (2006.01) |
| C09J 171/02 | (2006.01) |
| C09J 9/00 | (2006.01) |
| C09J 11/04 | (2006.01) |
| C08G 65/336 | (2006.01) |
| C09J 163/00 | (2006.01) |
| C08K 3/26 | (2006.01) |
| C08K 7/26 | (2006.01) |
| C08K 7/00 | (2006.01) |
| E04F 15/18 | (2006.01) |

(52) U.S. Cl.
CPC .......... *C09J 171/02* (2013.01); *C08G 65/336* (2013.01); *C09J 9/00* (2013.01); *C09J 11/04* (2013.01); *C09J 163/00* (2013.01); *C08K 3/26* (2013.01); *C08K 7/00* (2013.01); *C08K 7/26* (2013.01); *C08K 7/28* (2013.01); *C08K 2003/265* (2013.01); *E04F 15/18* (2013.01)

(58) Field of Classification Search
CPC .................................. C08K 3/26; C08K 7/28
USPC .......................................... 523/218; 524/425
See application file for complete search history.

(56) References Cited

FOREIGN PATENT DOCUMENTS

| JP | 5-163477 | 6/1993 |
| JP | 2000-154637 | 6/2000 |
| JP | 2005-171217 | 6/2005 |
| JP | 2006-143985 | 6/2006 |
| JP | 2009-24095 | 2/2009 |
| JP | 2009-24096 | 2/2009 |
| JP | 2010-111726 | 5/2010 |
| JP | 2012-57150 | 3/2012 |
| WO | 2013/047838 | 4/2013 |

OTHER PUBLICATIONS

International Search Report issued Dec. 3, 2013 in International (PCT) Application No. PCT/JP2013/076125.
English translation of JP 5324002, Oct. 23, 2013.

*Primary Examiner* — Edward Cain
(74) *Attorney, Agent, or Firm* — Wenderoth, Lind & Ponack, L.L.P.

(57) ABSTRACT

The present invention provides an adhesive for floor structure that can provide a floor structure inhibiting floor squeaks or joint gaps from occurring and that enables a floor finishing material to be peeled easily from a sub-floor material when repairing the floor finishing material.

The adhesive for floor structure of the present invention contains a hydrolyzable silyl group-containing polyoxypropylene-based polymer (I), calcium carbonate, and a hollow filler. The adhesive for floor structure of the present invention can be used for adhesively integrating a floor finishing material 20 with a sub-floor material 30 laid on a floor base 1.

4 Claims, 2 Drawing Sheets

[Fig. 1]
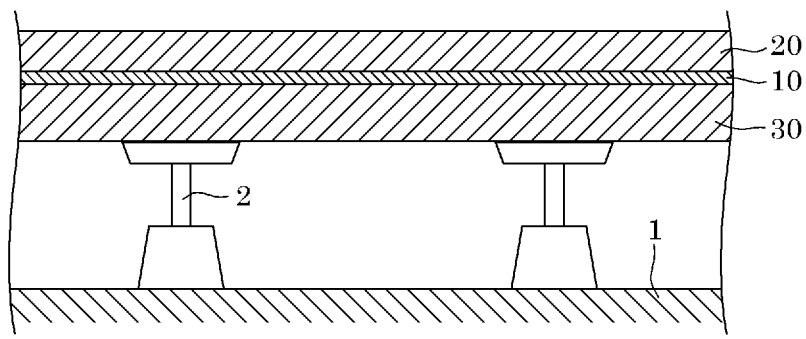
[Fig. 2]
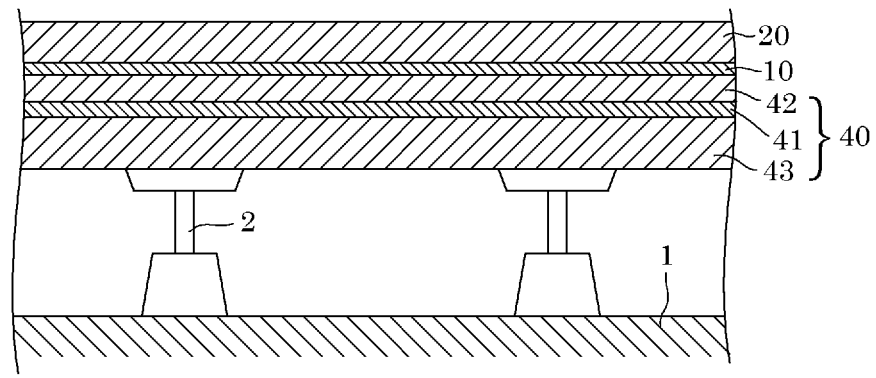
[Fig. 3]
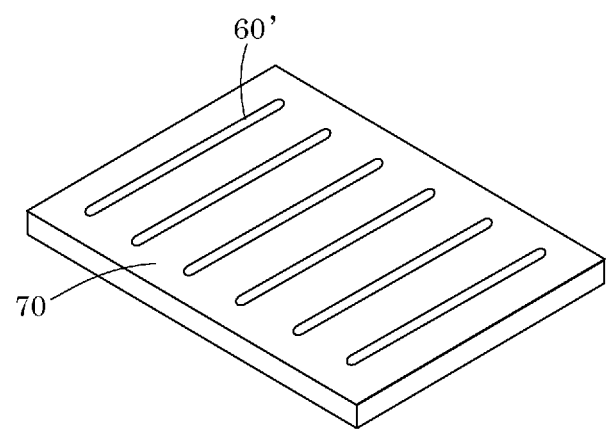

[Fig. 4]
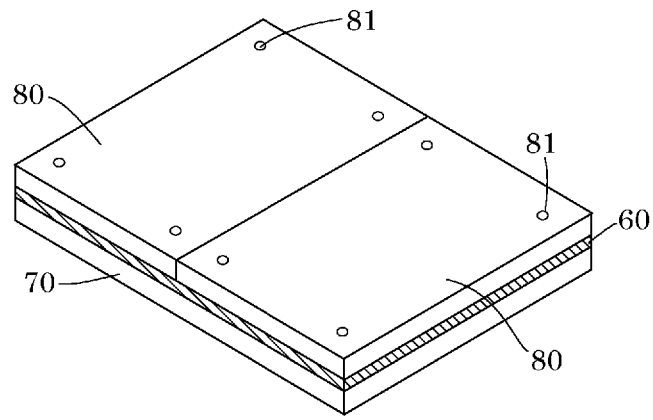
[Fig. 5]
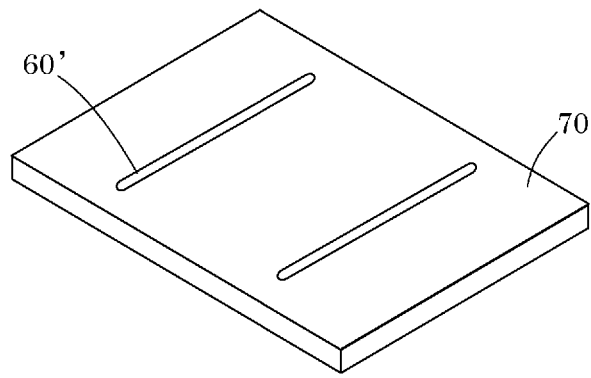
[Fig. 6]
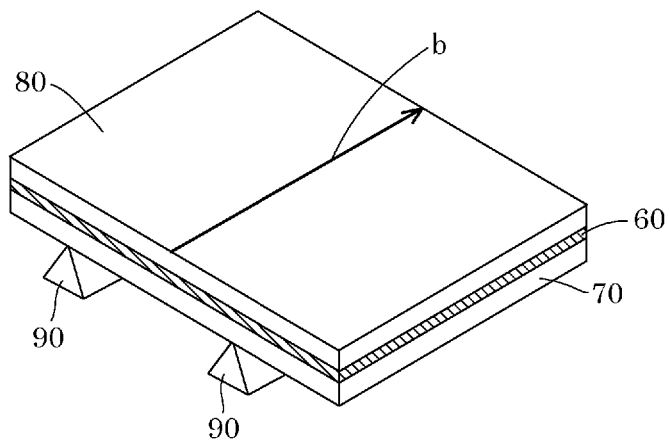

ADHESIVE FOR FLOOR STRUCTURE

TECHNICAL FIELD

The present invention relates to an adhesive for floor structure suitable for adhesively integrating a floor finishing material on a sub-floor material laid on a floor base.

BACKGROUND ART

In recent buildings, a sub-floor material is laid on a floor base such as a concrete floor slab by the intermediary of a leg member. Then, a floor finishing material is adhesively integrated with the sub-floor material by the intermediary of an adhesive to form a floor structure. The use of the floor finishing material having a wood grain pattern or the like improves the appearance and design features of the floor.

As an adhesive used for a floor structure, an epoxy-based adhesive or a urethane-based adhesive is used. However, in a floor structure formed with the epoxy-based adhesive or the urethane-based adhesive, a cured coating film of the adhesive is hard. Therefore, there has been a problem that the floor finishing material squeaks when a person walks on the floor finishing material. Such a problem is called a "floor squeak" or the like.

In order to inhibit the floor squeak, a floor structure formed with a modified silicone-based adhesive is known (Patent Literature 1). However, in the floor structure formed with a modified silicone-based adhesive, a cured coating film of the modified silicone-based adhesive is soft. Therefore, there has been a problem that the occurrence of shrinkage of the floor finishing material caused by temperature changes in the ambient environment causes a gap to be generated between adjacent floor finishing materials. Such a problem is called a "joint gap" or the like.

Also, when scratches are formed on the floor finishing material, the floor finishing material with scratches is peeled off from the sub-floor material, and a new floor finishing material is bonded to the sub-floor material. By replacing the floor finishing material in this manner, the floor finishing material is repaired. However, when conventional adhesives such as the epoxy-based adhesive, urethane-based adhesive, and modified silicone-based adhesive are used, the floor finishing material was firmly bonded to the sub-floor material by the intermediary of the adhesives. Accordingly, in some cases, the floor finishing material was inhibited from being easily peeled off from the sub-floor material. In such a case, an attempt to forcibly peel off the floor finishing material from the sub-floor material causes part of the sub-floor material to be peeled off together with the floor finishing material to damage the sub-floor material. Therefore, there has also been a problem that it is difficult to peel off only the floor finishing material for replacement.

CITATION LIST

Patent Literature

Patent Literature 1: Japanese Patent Application Laid-Open No. 2000-154637

SUMMARY OF INVENTION

Technical Problem

Therefore, an object of the present invention is to provide an adhesive for floor structure suitable for adhesively integrating a floor finishing material on a sub-floor material laid on a floor base, which can provide a floor structure with a reduced occurrence of floor squeaks or joint gaps, and which enables the floor finishing material to be easily peeled off from the sub-floor material when repairing the floor finishing material.

Means for Solving Problem

The adhesive for floor structure according to the present invention contains a hydrolyzable silyl group-containing polyoxypropylene-based polymer (I), calcium carbonate, and a hollow filler.

[Polyoxypropylene-Based Polymer (I)]

The polyoxypropylene-based polymer (I) used in the adhesive for floor structure of the present invention has a hydrolyzable silyl group. The hydrolyzable silyl group refers to a group in which a hydrolyzable group is bonded to a silicon atom, and in which the reaction with water such as moisture can form a siloxane bond for crosslinking.

One to 3 hydrolyzable groups can be bonded to one silicon atom. When a plurality of hydrolyzable groups is bonded to one silicon atom in the hydrolyzable silyl group, the hydrolyzable groups may be all the same type or a combination of different types.

Examples of the hydrolyzable group in the hydrolyzable silyl group include a hydrogen atom, a halogen atom, an alkoxy group, an acyloxy group, a ketoxymate group, an amino group, an amide group, an acid amide group, an aminooxy group, a mercapto group, and an alkenyloxy group. Among these, an alkoxy group is preferable, because the hydrolysis reaction is mild so that handling is easy, and the by-product generated during the hydrolysis is relatively excellent in safety.

Examples of the alkoxy group include a methoxy group, an ethoxy group, a propyloxy group, an isopropyloxy group, an n-butoxy group, a t-butoxy group, a phenoxy group, and a benzyloxy group. Among these, a methoxy group and an ethoxy group are preferable.

As the hydrolyzable silyl group, a dimethoxysilyl group is preferable, because the hydrolysis reaction is mild so that handling is easy, and the dehydration condensation reaction properties are excellent.

Examples of the main chain of the hydrolyzable silyl group-containing polyoxypropylene-based polymer include polyoxypropylene, a polyoxypropylene-polyoxyethylene copolymer, and a polyoxypropylene-polyoxybutylene copolymer. Among these, polyoxypropylene is preferable.

Also, the polyoxypropylene-based polymer (I) preferably contains no urethane bond. The inclusion of a urethane bond in the polyoxypropylene-based polymer (I) may increase the viscosity of the resulting adhesive for floor structure at low temperature such as during winter, which may lead to reduction of coating properties and storage stability.

The number average molecular weight of the polyoxypropylene-based polymer (I) is preferably 5,000 to 30,000, and more preferably 8,000 to 20,000. An extremely high number average molecular weight of the polyoxypropylene-based polymer (I) may increase the viscosity of the resulting adhesive for floor structure, which may lead to reduction of the coating properties or the like of the adhesive for floor structure. Also, an extremely low number average molecular weight of the polyoxypropylene-based polymer (I) may cause an adhesive layer formed by curing the adhesive for floor structure to become brittle, which may lead to reduction of the mechanical strength, adhesion and rubber elasticity of the adhesive layer.

In the present invention, the number average molecular weight of the polyoxypropylene-based polymer (I) is a polystyrene equivalent value as measured by a GPC (gel permeation chromatography) method. Specifically, 6 to 7 mg of the polyoxypropylene-based polymer (I) is sampled, and the sampled polyoxypropylene-based polymer (I) is supplied in a test tube. Then, an o-DCB (ortho-dichlorobenzene) solution containing 0.05% by weight of BHT (dibutylhydroxytoluene) is added in the test tube so that the concentration of the polyoxypropylene-based polymer (I) becomes 1 mg/mL. Thus, a diluted solution is prepared.

The diluted solution is shaken using a dissolution and filtration apparatus at 145° C. and at a rotation speed of 25 rpm for one hour, so that the polyoxypropylene-based polymer (I) dissolves in the o-DCB solution. Thus, a measurement sample is obtained. Using this measurement sample, the number average molecular weight of the polyoxypropylene-based polymer (I) is measured by the GPC method.

The number average molecular weight of the polyoxypropylene-based polymer (I) is measured, for example, with the following measurement apparatus and measurement conditions.

Measurement apparatus Trade name "HLC-8121GPC/HT" manufactured by Tosoh Corporation
Measurement conditions Columns: TSKgel GMHHR-H(20) HT×3
TSKguardcolumn-HHR(30)HT×1
Mobile phase: o-DCB 1.0 mL/min
Sample concentration: 1 mg/mL
Detector: Bryce-type refractometer
Reference material: polystyrene
(manufactured by Tosoh Corporation, Molecular weight: 500 to 8420000)
Elution condition: 145° C.
SEC temperature: 145° C.

The viscosity at 25° C. of the polyoxypropylene-based polymer (I) is preferably 1,500 to 100,000 mPa·s, more preferably 2,000 to 50,000 mPa·s, and particularly preferably 4,000 to 20,000 mPa·s. An extremely high viscosity of the polyoxypropylene-based polymer (I) may increase the viscosity of the resulting adhesive for floor structure, which may lead to reduction of the coating properties or the like of the adhesive for floor structure. Also, an extremely low viscosity of the polyoxypropylene-based polymer (I) may cause an adhesive layer formed by curing the adhesive for floor structure to become brittle, which may lead to reduction of the mechanical strength, adhesion and rubber elasticity of the adhesive layer.

In the present invention, the viscosity at 25° C. of the polyoxypropylene-based polymer (I) is measured by the method in conformity with JIS K1557.

A commercially available hydrolyzable silyl group-containing polyoxypropylene-based polymer (I) can be used. As a polyoxypropylene-based polymer (I) in which the main chain is polyoxypropylene, in which a dimethoxysilyl group is contained as the hydrolyzable silyl group at a terminal of the main chain, and in which a urethane bond is not contained, examples thereof include trade name Silyl EST280, EST250, and EST400 manufactured by Kaneka Corporation.

[Calcium Carbonate]

The adhesive for floor structure of the present invention uses a combination of the above-described polyoxypropylene-based polymer (I) and calcium carbonate, which enables the formation of an adhesive layer having an appropriate adhesion. With such an adhesive layer, while the floor finishing material can be adhesively integrated with the sub-floor material, the floor finishing material can be easily peeled off from the sub-floor material without damaging the sub-floor material, when repairing the floor finishing material in the floor structure formed with the above-described adhesive layer. Furthermore, since the adhesive for floor structure of the present invention uses a combination of the above-described polyoxypropylene-based polymer (I) and calcium carbonate, appropriate mechanical strength, appropriate rubber elasticity, and appropriate extensibility are also imparted to the adhesive layer while the adhesive layer is inhibited from becoming extremely soft. Therefore, the occurrence of floor squeaks or joint gaps in the floor structure formed with such an adhesive layer is highly reduced.

Preferred examples of the calcium carbonate include heavy calcium carbonate and precipitated calcium carbonate. The heavy calcium carbonate can be obtained by, for example, grinding naturally occurring calcium carbonate such as naturally occurring chalk, marble, and limestone into fine powder. Also, the precipitated calcium carbonate can be produced by, for example, a chemical reaction of limestone which is used as a raw material.

Examples of the precipitated calcium carbonate include light calcium carbonate and colloidal calcium carbonate. The primary particle size of the light calcium carbonate is preferably 1 to 3 μm. The light calcium carbonate preferably has a spindle shape or a columnar shape. Also, the primary particle size of the colloidal calcium carbonate is preferably 0.02 to 0.1 μm. The colloidal calcium carbonate preferably has a cube-like shape.

As the calcium carbonate, one of the heavy calcium carbonate and the precipitated calcium carbonate may be used, or the both may be used. Especially, both the heavy calcium carbonate and the colloidal calcium carbonate are preferably used. The use of the combination of the heavy calcium carbonate and the colloidal calcium carbonate impart the thixotropic properties to the adhesive for floor structure.

When both the heavy calcium carbonate and the colloidal calcium carbonate are used, the content of the heavy calcium carbonate in the adhesive for floor structure, with respect to 100 parts by weight of the hydrolyzable silyl group-containing polyoxypropylene-based polymer (I), is preferably 30 to 500 parts by weight, more preferably 50 to 350 parts by weight, and particularly preferably 50 to 150 parts by weight.

Also, when both the heavy calcium carbonate and the colloidal calcium carbonate are used, the content of the colloidal calcium carbonate in the adhesive for floor structure, with respect to 100 parts by weight of the hydrolyzable silyl group-containing polyoxypropylene-based polymer (I), is preferably 10 to 300 parts by weight, and more preferably 10 to 100 parts by weight.

The calcium carbonate is preferably surface-treated with a fatty acid or a fatty acid ester. The surface treatment of the calcium carbonate with a fatty acid or a fatty acid ester inhibits the calcium carbonate from aggregating.

[Silanol Condensation Catalyst]

The adhesive for floor structure of the present invention preferably contains a silanol condensation catalyst. The silanol condensation catalyst is a catalyst for promoting a dehydration condensation reaction between silanol groups. The silanol group is formed through hydrolysis of the hydrolyzable silyl group contained in the polyoxypropylene-based polymer (I). The silanol group refers to a hydroxy group directly bonding to a silicon atom (≡Si—OH).

Examples of the silanol condensation catalyst include organotin-based compounds such as dibutyltin dilaurate, dibutyltin oxide, dibutyltin diacetate, dibutyltin phthalate, bis(dibutyltin laurate)oxide, dibutyltin bis(acetylacetonate), dibutyltin bis(monoester malate), tin octylate, dibutyltin octoate, dioctyltin oxide, dibutyltin bis(triethoxysilicate), dioctyltin dilaurate, bis(dibutyltin bistriethoxysilicate)oxide, and dibutyltin oxybisethoxysilicate; organic titanium-based compounds such as tetra-n-butoxytitanate and tetraisopropoxytitanate; cycloamidine-based compounds such as 1,5,7-triazabicyclo[4.4.0]dec-5-ene, 7-methyl-1,5,7-triazabicyclo[4.4.0]dec-5-ene, 1,8-diazabicyclo[5.4.0]undec-7-ene, 6-dibutylamino-1,8-diazabicyclo[5.4.0]undec-7-ene, and 1,5-diazabicyclo[4.3.0]non-5-ene; and dibutylamine-2-ethyl hexoate. Other acidic catalysts and basic catalysts can also be used as the silanol condensation catalyst. These silanol condensation catalysts may be used singly or in any combination of two or more.

Among these, preferable examples of the silanol condensation catalyst include organotin-based compounds and cycloamidine-based compounds. Dibutyltin bis(triethoxysilicate), dioctyl bis(triethoxysiloxy)tin, and 1,8-diazabicyclo[5.4.0]undec-7-ene are more preferable, and dioctyl bis(triethoxysiloxy)tin is particularly preferable. With these silanol condensation catalysts, the occurrence of floor squeaks or joint gaps in the floor structure formed with the adhesive for floor structure is highly reduced.

The content of the silanol condensation catalyst in the adhesive for floor structure, with respect to 100 parts by weight of the polyoxypropylene-based polymer (I), is preferably 0.1 to 5 parts by weight, and more preferably 0.5 to 3 parts by weight. An extremely low content of the silanol condensation catalyst in the adhesive for floor structure may decreases the curing rate of the adhesive for floor structure, which may lead to increase of a time required for curing of the adhesive for floor structure. Also, an extremely high content of the silanol condensation catalyst in the adhesive for floor structure may cause the curing rate of the adhesive for floor structure to become extremely high, which may lead to reduction of the storage stability and handling properties of the adhesive for floor structure.

[Hollow Filler]

The adhesive for floor structure of the present invention contains a hollow filler. With the hollow filler, an adhesive layer formed by curing the adhesive for floor structure containing the hollow filler has appropriate mechanical strength and appropriate rubber elasticity, and the occurrence of floor squeaks or joint gaps in the floor structure formed with the adhesive layer is highly reduced.

Examples of the hollow filler include hollow inorganic fillers such as glass balloons, silica balloons, ceramic balloons, Shirasu balloons, and fly ash balloons; and a hollow organic filler formed from a synthetic resin such as polyvinylidene fluoride or a polyvinylidene fluoride copolymer. These hollow fillers may be used singly or in any combination of two or more.

The hollow filler is preferably a hollow inorganic filler. Glass balloons, Shirasu balloons, and fly ash balloons are more preferable, and Shirasu balloons and fly ash balloons are particularly preferable.

The glass balloons are fillers containing glass and having a hollow spherical shape, and are also referred to as "glass hollow filler". Such glass balloons are commercially available as, for example, Glass Bubbles S series and K series manufactured by Sumitomo 3M Limited.

The Shirasu balloons are foam bodies prepared by instantaneously heating volcanic ash (Shirasu) at approximately 1000° C. Such Shirasu balloons are commercially available as, for example, VS Light series from Daiken Corporation.

The fly ash balloons are fillers including ash contained in flue gas in a coal fired power station or the like and having a hollow spherical shape. The fly ash balloons contain silica and alumina as main components. Such fly ash balloons are commercially available as, for example, Fillite series from Japan Fillite Co., Ltd.

The average particle size of the hollow filler is preferably 40 to 200 µm, and more preferably 40 to 150 µm.

The average particle size of the hollow filler is defined as a value measured using a laser diffraction and scattering-type particle size analysis and measurement apparatus. For example, the hollow filler is poured in methanol to obtain a concentration of 10% by weight, and then the obtained mixture is irradiated with ultrasonic waves at an output of 1 kw for 10 minutes using an ultrasonic homogenizer to obtain a suspension. A volume particle size distribution of the hollow filler in the suspension is measured using a laser diffraction and scattering-type particle size analysis and measurement apparatus (for example, SACD-2100 manufactured by Shimadzu Corporation). The value at 50% accumulation of this volume particle size distribution is calculated as the average particle size of the hollow filler.

The true density of the hollow filler is preferably 0.1 to 1.0 $g/cm^3$, and more preferably 0.15 to 0.8 $g/cm^3$. With the hollow filler having the density falling within the above-described range, the adhesive layer formed by curing the adhesive for floor structure containing the hollow filler has more appropriate mechanical strength and more appropriate rubber elasticity.

The true density of the hollow filler is measured by, for example, a gas displacement method, using a density measurement device (for example, AccuPyc II 1340 manufactured by Shimadzu Corporation).

The content of the hollow filler in the adhesive for floor structure, with respect to 100 parts by weight of the polyoxypropylene-based polymer (I), is preferably 1 to 30 parts by weight, more preferably 1 to 20 parts by weight, and particularly preferably 5 to 20 parts by weight. An extremely low content of the hollow filler in the adhesive for floor structure may inhibit the adhesive layer formed by curing the adhesive for floor structure from having appropriate mechanical strength and rubber elasticity. Also, an extremely high content of the hollow filler in the adhesive for floor structure may increase the viscosity of the resulting adhesive for floor structure, which may lead to reduction of the coating properties or the like of the adhesive for floor structure.

[Flaky Inorganic Filler]

The adhesive for floor structure of the present invention preferably contains a flaky inorganic filler. The use of the flaky inorganic filler having a flaky (scaly) shape imparts more appropriate mechanical strength and rubber elasticity to the adhesive layer formed by curing the adhesive for floor structure. This highly reduces the occurrence of floor squeaks or joint gaps in the floor structure formed with the adhesive layer.

The average aspect ratio of the flaky inorganic filler is preferably 4 to 150, and more preferably 10 to 100. An extremely low average aspect ratio of the flaky inorganic filler may inhibit the adhesive layer formed by curing the adhesive for floor structure from having mechanical strength. Also, an extremely high average aspect ratio of the flaky inorganic filler may cause the viscosity of the adhesive for floor structure to become extremely high, which may lead to reduction of coating properties.

The aspect ratio of the flaky inorganic filler in the present invention refers to a ratio (L/T) between a maximum length (L) and a maximum thickness (T) of the flaky inorganic filler when the flaky inorganic filler is seen from the direction in which an area of the inorganic filler becomes the largest. Then, at least 100 flaky inorganic fillers are measured for the aspect ratio, and an arithmetic mean value thereof is defined as the average aspect ratio.

The average maximum length of the flaky inorganic filler is preferably 1 to 50 μm, and more preferably 10 to 30 μm. An extremely short average maximum length of the flaky inorganic filler may inhibit the adhesive layer from having sufficient mechanical strength and rubber elasticity. An extremely long average maximum length of the flaky inorganic filler may reduce the rubber elasticity of the adhesive layer on the contrary.

The maximum length of the flaky inorganic filler in the present invention refers to a maximum length of the flaky inorganic filler when the flaky inorganic filler is seen from the direction in which an area thereof becomes the largest. Then, at least 100 flaky inorganic fillers are measured for the maximum length, and an arithmetic average value thereof is defined as the average maximum length.

Examples of a material constituting the flaky inorganic filler include mica, talc, silica, vermiculite, alumina, and isinglass. Among these, talc is preferable.

The content of the flaky inorganic filler in the adhesive for floor structure, with respect to 100 parts by weight of the polyoxypropylene-based polymer (I), is preferably 30 to 200 parts by weight, more preferably 50 to 150 parts by weight, and particularly preferably 100 to 150 parts by weight. An extremely low content of the flaky inorganic filler in the adhesive for floor structure may inhibit the adhesive layer formed by curing the adhesive for floor structure from having appropriate mechanical strength and appropriate rubber elasticity. Also, an extremely high content of the flaky inorganic filler in the adhesive for floor structure may increase the viscosity of the resulting adhesive for floor structure, which may lead to reduction of the coating properties or the like of the adhesive for floor structure.

[Aminosilane Coupling Agent]

The adhesive for floor structure of the present invention preferably contains no aminosilane coupling agent. The use of the aminosilane coupling agent may cause the adhesion of the adhesive for floor structure to become extremely high, which may lead to difficulty of peeling off the floor finishing material from the floor structure.

The aminosilane coupling agent refers to a compound that contains, in one molecule, a silicon atom bonded to an alkoxy group, and a functional group containing a nitrogen atom. Specific examples of the aminosilane coupling agent include 3-aminopropyl trimethoxysilane, 3-aminopropylmethyl dimethoxysilane, 3-aminopropyl triethoxysilane, N-(2-aminoethyl)-3-aminopropyl trimethoxysilane, N-(2-aminoethyl)-3-aminopropyl triethoxysilane, N,N'-bis-[3-(trimethoxysilyl)propyl]ethylenediamine, N,N'-bis-[3-(triethoxysilyl)propyl]ethylene diamine, N,N'-bis-[3-(methyldimethoxysilyl)propyl]ethylene diamine, N,N'-bis-[3-(trimethoxysilyl)propyl]hexamethylenediamine, and N,N'-bis-[3-(triethoxysilyl)propyl]hexamethylenediamine.

[Epoxysilane Coupling Agent]

The adhesive for floor structure of the present invention preferably further contains an epoxysilane coupling agent. The adhesive for floor structure containing the epoxysilane coupling agent highly reduces the occurrence of floor squeaks and joint gaps in the floor structure.

The epoxysilane coupling agent refers to a compound that contains, in one molecule, a silicon atom bonded to an alkoxy group, and a functional group containing an epoxy group. Specific examples of the epoxysilane coupling agent include 3-glycidoxypropyl trimethoxysilane, 3-glycidoxypropyl triethoxysilane, 3-glycidoxypropylmethyl dimethoxysilane, 3-glycidoxypropylethyl diethoxysilane, and 2-(3,4epoxycyclohexyl)ethyl trimethoxysilane. These epoxysilane coupling agents may be used singly or in any combination of two or more. Among these, 3-glycidoxypropyl trimethoxysilane is preferable.

The content of the epoxysilane coupling agent in the adhesive for floor structure, with respect to 100 parts by weight of the polyoxypropylene-based polymer (I), is preferably 0.1 to 10 parts by weight, and more preferably 1 to 5 parts by weight. An extremely low content of the epoxysilane coupling agent in the adhesive for floor structure may inhibit the effect by the addition of the epoxysilane coupling agent from being sufficiently obtained. Also, an extremely high content of the epoxysilane coupling agent in the adhesive for floor structure may cause the adhesion of the adhesive for floor structure to become extremely high, which may lead to difficulty of peeling off the sub-floor material from the floor finishing material.

[Dehydrating Agent]

The adhesive for floor structure of the present invention preferably further contains a dehydrating agent. The dehydrating agent inhibits the adhesive for floor structure from being cured by moisture contained in the air or the like while the adhesive for floor structure is stored.

Examples of the dehydrating agent include silane compounds such as vinyl trimethoxysilane, dimethyl dimethoxysilane, tetraethoxysilane, methyl trimethoxysilane, methyl triethoxysilane, tetramethoxysilane, phenyl trimethoxysilane, and diphenyl dimethoxysilane; and ester compounds such as methyl orthoformate, ethyl orthoformate, methyl orthoacetate, and ethyl orthoacetate. These dehydrating agents may be used singly or in any combination of two or more. Among these, vinyl trimethoxysilane is preferable.

The content of the dehydrating agent in the adhesive for floor structure, with respect to 100 parts by weight of the polyoxypropylene-based polymer (I), is preferably 0.5 to 20 parts by weight, more preferably 1 to 15 parts by weight, and particularly preferably 1 to 5 parts by weight. An extremely low content of the dehydrating agent in the adhesive for floor structure may make the effect obtained by the dehydrating agent insufficient. Also, an extremely high content of the dehydrating agent in the adhesive for floor structure may cause the storage stability and handling properties of the adhesive for floor structure to deteriorate.

[Reactive Diluent]

The adhesive for floor structure of the present invention preferably further contains a reactive diluent. The adhesive for floor structure containing the reactive diluent highly reduces the occurrence of floor squeaks and joint gaps in the floor structure.

Examples of the reactive diluent include a diluent containing a hydrolyzable silyl group. The preferred reactive diluent is a hydrolyzable silyl group-containing polyoxyalkylene-based polymer (II) having a viscosity at 25° C. of 200 to 1000 mPa·s. The viscosity of the polyoxyalkylene-based polymer (II) is preferably 200 to 500 mPa·s.

Examples of the main chain of the polyoxyalkylene-based polymer (II) include polyoxyethylene, polyoxypropylene, and a polyoxypropylene-polyoxybutylene copolymer. Among these, polyoxypropylene is preferable.

Examples of the hydrolyzable silyl group in the polyoxyalkylene-based polymer (II) include the same groups as the hydrolyzable silyl group in the polyoxypropylene-based polymer (I). The preferred hydrolyzable silyl group is a dimethoxysilyl group.

In the present invention, the viscosity at 25° C. of the polyoxyalkylene-based polymer (II) is measured by the method in conformity with JIS K1557.

The polyoxyalkylene-based polymer (II) preferably has in one molecule 0.5 to 3 hydrolyzable silyl groups in terms of a number average. The adhesive for floor structure containing such a polyoxyalkylene-based polymer (II) more highly reduces the occurrence of joint gaps in the floor structure. The number of hydrolyzable silyl groups in the polyoxyalkylene-based polymer (II) is measured by 1H-NMR.

A commercially available product can be employed for the reactive diluent. Examples thereof include trade name "SAT 010" and "SAX 015" manufactured by Kaneka Corporation.

The content of the reactive diluent in the adhesive for floor structure, with respect to 100 parts by weight of the polyoxypropylene-based polymer (I), is preferably 5 to 100 parts by weight, and more preferably 5 to 30 parts by weight. An extremely low content of the reactive diluent in the adhesive for floor structure may make the effect obtained by the reactive diluent insufficient. Also, an extremely high content of the reactive diluent in the adhesive for floor structure may cause the coating properties of the adhesive for floor structure to deteriorate.

[Other Additives]

The adhesive for floor structure of the present invention may contain other additives such as an antioxidant, a UV absorber, a pigment, a dye, an anti-settling agent, and a solvent. Among these, an antioxidant and a UV absorber may be preferably included.

Examples of the antioxidant include a hindered phenol-based antioxidant, a monophenol-based antioxidant, a bisphenol-based antioxidant, and a polyphenol-based antioxidant. The content of the antioxidant in the adhesive for floor structure, with respect to 100 parts by weight of the polyoxypropylene-based polymer (I), is preferably 0.1 to 20 parts by weight, and more preferably 0.3 to 10 parts by weight.

Examples of the UV absorber include a benzotriazole-based UV absorber and a benzophenone-based UV absorber. Among these, the benzotriazole-based UV absorber is preferable. The content of the UV absorber in the adhesive for floor structure, with respect to 100 parts by weight of the polyoxypropylene-based polymer (I), is preferably 0.1 to 20 parts by weight, and more preferably 0.1 to 10 parts by weight.

The adhesive for floor structure of the present invention can be manufactured by the method of mixing the hydrolyzable silyl group-containing polyoxypropylene-based polymer (I), the calcium carbonate, the hollow filler, and, as necessary, other additives. The mixing is preferably performed under reduced pressure.

[Floor Structure]

The adhesive for floor structure of the present invention can be used for forming a floor structure. The floor structure has a floor base, a sub-floor material laid on the floor base, an adhesive layer formed by curing an adhesive for floor structure adhesively integrated with the sub-floor material, and a floor finishing material adhesively integrated with the adhesive layer. Also, a spacer may be arranged between the floor base and the sub-floor material.

An example of a schematic cross-sectional view of the floor structure using the adhesive for floor structure of the present invention is illustrated in FIG. 1. The floor structure illustrated in FIG. 1 has a sub-floor material 30 laid on a floor base 1 by the intermediary of a spacer 2, and a floor finishing material 20 adhesively integrated with the sub-floor material 30 by the intermediary of an adhesive layer 10 formed by curing the adhesive for floor structure of the present invention.

Such a floor structure is constructed by, for example, laying the sub-floor material 30 on the floor base 1 such as a concrete slab on grade or a concrete floor slab by the intermediary of the spacer 2, applying the adhesive for floor structure to the sub-floor material 30 and then laying the floor finishing material 20 on the adhesive for floor structure, and leaving these to stand for a prescribed time to cure the adhesive for floor structure to thereby obtain the adhesive layer 10 and adhesively integrate the floor finishing material 20 with the sub-floor material 30 by the intermediary of this adhesive layer 10.

Also, although the sub-floor material 30 is laid on the floor base 1 by the intermediary of the spacer 2 in order to maintain the sub-floor material 30 and the floor base 1 in a non-contact state in the above, the sub-floor material 30 may be directly laid on the floor base 1 without inserting the spacer 2.

Examples of the member constituting the floor finishing material include plywood, medium density fiberboard (MDF), tiles, vinyl chloride sheets, and stone materials.

Examples of the member constituting the sub-floor material include plywood, particle boards, wooden floor joists, plaster boards, slate plates, and concrete plates. Among these, the sub-floor material including wooden members such as plywood and particle boards is preferably used. When the floor finishing material is adhesively integrated with the sub-floor material including the wooden member by the intermediary of a conventional adhesive, the floor finishing material is hardly peeled off from the sub-floor material, and is therefore likely to raise a problem that when attempting to forcibly peel off the floor finishing material from the sub-floor material, part of the sub-floor material is peeled off together with the floor finishing material to damage the sub-floor material. However, when the adhesive for floor structure of the present invention is used to adhesively integrate the floor finishing material with the sub-floor material, the floor finishing material can be easily peeled off from the sub-floor material without damaging the sub-floor material when repairing the floor finishing material. Therefore, the adhesive for floor structure of the present invention is preferably used for bonding the floor finishing material and the sub-floor material including the wooden member.

Also, as the sub-floor material, a damping complex 40, in which a damping sheet 42 is adhesively integrated with a base substrate 43 by the intermediary of an adhesive layer 41, can be used as shown in FIG. 2. The floor structure shown in FIG. 2 has the same configuration as the floor structure shown in FIG. 1, except that the damping complex 40 is used instead of the sub-floor material 30.

Examples of the damping sheet 42 include a sheet formed by mixing a high specific gravity substance in synthetic resins or asphalt. Examples of the high specific gravity substance include inorganic powder such as barium sulfate; and metal powder such as lead and iron. Examples of the synthetic resins include polyethylene, polyurethane, and vinyl chloride.

Examples of the member constituting the base substrate 43 include plywood, particle boards, wooden floor joists, plaster boards, slate plates, and concrete plates.

The adhesive layer 41 is formed by curing any conventionally known adhesive. Examples of the conventionally known adhesive include an epoxy-based adhesive and a urethane-based adhesive.

The adhesive for floor structure of the present invention is cured by the moisture in the air and the moisture contained in the floor finishing material and the sub-floor material, which leads to enable the floor finishing material to be adhesively integrated with the sub-floor material. The adhesive layer formed by curing the adhesive for floor structure has appropriate mechanical strength and appropriate rubber elasticity. Accordingly, the occurrence of joint gaps and floor squeaks in the floor structure formed with the adhesive for floor structure is highly reduced.

The Shore A hardness of the adhesive layer formed by curing the adhesive for floor structure is preferably 55 to 85, and more preferably 60 to 75. A Shore A hardness of the adhesive layer of less than 55 may cause the adhesive layer to become extremely soft, which may lead to the occurrence of joint gaps in the floor structure. Also, a Shore A hardness of the adhesive layer of more than 85 may inhibit the occurrence of floor squeaks in the floor structure from being highly reduced.

In the present invention, the Shore A hardness of the adhesive layer formed by curing the adhesive for floor structure is measured as follows. First, the adhesive for floor structure is applied on a piece of softwood plywood as a substrate with a width of 10 mm and a thickness of 10 mm. After that, the applied adhesive is left to stand in an atmosphere of a temperature of 23° C. and a relative humidity of 50% for 14 days to thereby form an adhesive layer. Then, the Shore A hardness of this adhesive layer is measured in conformity with JIS K6253 using an A-type hardness meter.

Also, since the adhesive layer formed by curing the adhesive for floor structure of the present invention has appropriate adhesion, the floor finishing material can be adhesively integrated with the sub-floor material to form the floor structure. Nevertheless, in occasions such as when repairing the floor finishing material, the peeling-off from the sub-floor material can be easily performed without damaging the sub-floor material.

The 90° peel strength of the adhesive layer to wood is preferably 0.1 to 5 N/cm, and more preferably 0.1 to 3 N/cm. A 90° peel strength of the adhesive layer to wood of less than 0.1 N/cm may make the adhesion of the adhesive layer insufficient. Also, a 90° peel strength of the adhesive layer to wood of more than 5 N/cm may inhibit the floor finishing material from being peeled off from the sub-floor material, without damaging the sub-floor material, in the floor structure formed with such an adhesive layer.

The 90° peel strength of the adhesive layer to wood is measured as follows. First, the adhesive for structure is applied in a bead shape (width: 25 mm, thickness: 5 mm) on one surface of a piece of softwood plywood as wood. After that, the applied adhesive is left to stand in an atmosphere of a temperature of 23° C. and a relative humidity of 50% for 7 days to thereby be cured, so that the adhesive layer is formed. Then, the peel strength (N/cm) is measured when the adhesive layer is peeled off from one end toward another end in a longitudinal direction toward a 90° direction with respect to the one surface of the softwood plywood at a speed of 100 mm/min.

Advantageous Effects of Invention

Since the adhesive layer formed by curing the adhesive for floor structure of the present invention has appropriate mechanical strength and appropriate rubber elasticity, the occurrence of joint gaps and floor squeaks is highly reduced in the floor structure formed with the adhesive for floor structure. Furthermore, in the floor structure formed with the adhesive for floor structure, the peeling-off from the sub-floor material can be easily performed without damaging the sub-floor material. Therefore, in the floor structure formed with the adhesive for floor structure, the floor finishing material can be efficiently replaced when repairing the floor finishing material.

BRIEF DESCRIPTION OF DRAWINGS

FIG. 1 is a schematic cross-sectional view of a floor structure that is a suitable embodiment of the present invention.

FIG. 2 is a schematic cross-sectional view of a floor structure that is another suitable embodiment of the present invention.

FIG. 3 is a schematic view of a sub-floor material, in which an adhesive is applied to one surface in a bead shape, in a joint gap test of an example.

FIG. 4 is a schematic view illustrating that a floor finishing material is fixed on a sub-floor material, in which an adhesive is applied to one surface in a bead shape, in a joint gap test of an example.

FIG. 5 is a schematic view of a sub-floor material, in which an adhesive is applied to one surface in a bead shape, in a floor squeak test of an example.

FIG. 6 is a schematic view illustrating that a floor finishing material is adhesively integrated with a sub-floor material, in which an adhesive is applied to one surface in a bead shape, in a floor squeak test of an example.

DESCRIPTION OF EMBODIMENTS

Although embodiments of the present invention will be described in further detail below with reference to examples, the present invention is not limited only to these examples.

EXAMPLES

Examples 1 to 17 and Comparative Examples 1 to 3

The following ingredients were mixed in formulation amounts shown in Tables 1 to 3, while decreasing the pressure in a sealed stirrer, until the mixture became uniform, to thereby prepare adhesives: the polyoxypropylene-based polymer (I) containing a dimethoxysilyl group as the hydrolyzable silyl group and polyoxypropylene as a main chain (number average molecular weight 10,000, viscosity at 25° C. 7,000 mPa·s, product name Silyl EST280 manufactured by Kaneka Corporation), heavy calcium carbonate (Whiton SB manufactured by Shiraishi Calcium Kaisha, Ltd.), colloidal calcium carbonate (Calfine 200M manufactured by Shiraishi Calcium Kaisha, Ltd.), a silanol condensation catalyst 1 (dibutyltin bis(triethoxysilicate) Neostan S-303 manufactured by Nitto Kasei Co., Ltd.), a silanol condensation catalyst 2 (1,8-diazabicyclo[5.4.0]undec-7-ene, DBU manufactured by San-Apro Ltd.), a silanol condensation catalyst 3 (dioctyl bis(triethoxysiloxy)tin, trade name "Neostan S-1" manufactured by Nitto Kasei Co., Ltd.), glass balloons (average particle size 45 μm, true density 0.37 g/cm$^3$, Glass Bubbles K37 manufactured by Sumitomo 3M Limited), fly ash balloons (average particle size 130 μm, true density 0.75 g/cm$^3$, product name "Omega-Spheres SG" manufactured by Omega Minerals Germany GmbH), Shirasu balloons (average particle size 37 μm, true density 1.27 g/cm$^3$, product name "VS Light DA-30N" manufactured by Daiken Corporation), flaky talc (average aspect ratio 60, average maximum length 25 μm, product name "MS-KY" manufactured by Nippon Talc Co., Ltd.), an aminosilane coupling agent (N-(2-aminoethyl)-3-aminopropyl trimethoxysilane, KBM-603 manufactured by Shin-Etsu Chemical Co., Ltd.), an epoxysilane coupling agent (3-glycidoxypropyl trimethoxysilane, KBM-403 manufactured by Shin-Etsu Chemical Co., Ltd.), a dehydrating agent (vinyl trimethoxysilane), the polyoxypropylene-based copolymer (II) in which one dimethoxysilyl group is contained in one molecule in terms of a number average and a main chain structure is polyoxypropylene (number average molecular weight 4,500, viscosity at 25° C. 400 mPa·s, product name "SAX015" manufactured by Kaneka Corporation) as a reactive diluent, and a hindered phenol-based antioxidant (Irganox (registered trademark) 1010 manufactured by BASF).

(Evaluation)

The adhesives prepared in the above were evaluated for the following evaluations. The results are shown in Tables 1 to 3.

(Shore A Hardness)

In accordance with the above-described procedure, the adhesives were used to form the adhesive layers, and then these adhesive layers were measured for Shore A hardness.

(90° Peel Test)

In accordance with the above-described procedure, the adhesives were used to form the adhesive layers, and 90° peel strength of these adhesive layers was measured. Also, after the adhesive layers were peeled off from softwood plywood, the failure states of the adhesive layers were visually inspected. In Tables 1 to 3, when the adhesive layer was peeled off from the softwood plywood, "excellent" was assigned for cohesive failure of the whole adhesive layer; "good" was assigned for coexistence of cohesive failure and interfacial failure of the adhesive layer; and "failure" was assigned for interfacial failure of the whole adhesive layer.

The cohesive failure of the adhesive layer refers to a state where the adhesive layer was failed when peeling off the adhesive layer from the softwood plywood. Also, the interfacial failure of the adhesive layer refers to a state where the peeling occurred at an interface between the softwood plywood and the adhesive layer when peeling off the adhesive layer from the softwood plywood. A higher adhesion of the adhesive layer causes more cohesive failure, and a lower adhesion of the adhesive layer causes more interfacial failure.

(Joint Gap Test)

A sub-floor material 70 (softwood plywood: length 300 mm×width 1800 mm×thickness 20 mm) was heated at 80° C. for one week to thereby be dried. After that, as shown in FIG. 3, an adhesive 60' was applied to the sub-floor material 70 in a lateral direction in a bead shape (width 6 mm, thickness 5 mm) such that six beads are placed with a distance from each other of 6 mm. After that, as shown in FIG. 4, onto the surface of the sub-floor material 70 where the adhesive 60' was applied, two floor finishing materials 80 (softwood plywood: length 300 mm×width 900 mm×thickness 12 mm) were laminated to thereby obtain a layered body. At this time, one end in the lateral direction of one of the floor finishing materials 80 was arranged so as to come into contact with the other end in the lateral direction of the other of the floor finishing materials 80. Next, nails 81 were driven through the floor finishing materials 80 of the layered body at four corners to fix the floor finishing materials 80 to the sub-floor material 70. After that, the layered body was aged in an atmosphere of a temperature of 23° C. and a relative humidity of 55% for two weeks, so that the adhesive 60' was cured to become an adhesive layer 60. In this manner, a connection body (I) was obtained in which the floor finishing materials 80 were adhesively integrated with the sub-floor material 70 by the intermediary of the adhesive layer 60. Then, this connection body (I) was dried in an atmosphere of a temperature of 80° C. and a relative humidity of 2% for one week. The dimension (mm) of the joint gap generated between the two floor finishing materials in the dried connection body (I) was measured.

(Floor Squeak Test)

As shown in FIG. 5, an adhesive 60' was applied to a sub-floor material 70 (softwood plywood: length 300 mm×width 450 mm×thickness 20 mm) in a lateral direction of the sub-floor material in a bead shape (width 6 mm, thickness 5 mm) such that two beads are placed with a distance from each other of 300 mm. After that, onto the surface of the sub-floor material 70 where the adhesive 60' was applied, a floor finishing material 80 (softwood plywood: length 300 mm×width 450 mm×thickness 12 mm) was laminated, and pressure was applied on the floor finishing material 80 to press and spread the adhesive 60' between the sub-floor material 70 and the floor finishing material 80. After that, a 10 kg weight was placed on a central region of the floor finishing material 80 to pressure-bond the sub-floor material 70 and the floor finishing material 80, to thereby obtain a layered body. This layered body was aged in an atmosphere of a temperature of 23° C. and a relative humidity of 55% for two weeks, so that the adhesive 60' was cured to produce an adhesive layer 60. Thus, a connection body (II) was obtained in which the floor finishing material 80 was adhesively integrated with the sub-floor material 70 by means of the adhesive layer 60. The sub-floor material 70 of the connection body (II) was supported by two supports 90 at both ends in the longitudinal direction as shown in FIG. 6. Then, bending stress was applied on a central region b in the longitudinal direction of the floor finishing material 80 of the connection body (II) toward the lateral direction of the floor finishing material 80 at a speed of 500 mm/min, such that a displacement (distortion) of 3 mm is generated. Accordingly, the occurrence of floor squeaks caused by the peeling or cracking of the floor finishing material 80 was evaluated. Note that "good" and "fail" in Tables 1 to 3 are as follows.

Good: Floor squeaks did not occur.

Fail: Floor squeaks occurred.

(Peeling-Off Test 1)

An adhesive in a bead shape (width 6 mm, thickness 5 mm, length 1800 mm) was applied to a piece of softwood plywood (length 300 mm×width 1800 mm×thickness 20 mm). The piece of softwood plywood stood in an atmosphere of a temperature of 23° C. and a relative humidity of 50% for 7 days, to thereby obtain a cured product. Then, the cured product was peeled off from the softwood plywood using a scraper from one end toward the other end in the length direction thereof, and a time (second) taken for peeling off the whole cured product from the softwood plywood was measured.

(Peeling-Off Test 2)

In the same manner as that in the above-described floor squeak test, there was obtained a connection body (II) in which the floor finishing materials 80 were adhesively integrated with the sub-floor material 70 by means of the adhesive layer 60. Then, the floor finishing material 80 was peeled off from the sub-floor material 70 in this connection body (II) using a crowbar. At this time, "good" was assigned when the floor finishing material 80 was able to be peeled off from the sub-floor material 70 without damaging the sub-floor material 70, and "fail" was assigned when at least part of the sub-floor material 70 was peeled off together with the floor finishing material 80 causing the sub-floor material 70 to be damaged while peeling off the floor finishing material 80 from the sub-floor material 70.

TABLE 1

|  |  | Examples |  |  |  | Comparative Examples |  |
|---|---|---|---|---|---|---|---|
|  |  | 1 | 2 | 3 | 4 | 1 | 2 |
| Formulation (part by weight) | Polyoxypropylene-based polymer (I) | 100 | 100 | 100 | 100 | 100 | 100 |
|  | Heavy calcium carbonate | 100 | 100 | 100 | 100 | 100 | 100 |
|  | Colloidal calcium carbonate | 50 | 50 | 50 | 100 | 50 | 50 |
|  | Silanol condensation catalyst 1 | 2 | 2 | 0 | 2 | 2 | 2 |
|  | Silanol condensation catalyst 2 | 0 | 0 | 2 | 0 | 0 | 0 |
|  | Glass balloon | 5 | 5 | 5 | 5 | 0 | 0 |
|  | Fly ash balloon | 0 | 0 | 0 | 0 | 0 | 0 |
|  | Flaky talc | 0 | 0 | 0 | 0 | 0 | 0 |
|  | Aminosilane coupling agent | 0 | 0 | 0 | 0 | 4 | 0 |
|  | Epoxysilane coupling agent | 0 | 2 | 0 | 0 | 0 | 2 |
|  | Dehydrating agent | 4 | 4 | 4 | 4 | 4 | 4 |
|  | Hindered phenol-based antioxidant | 2 | 2 | 2 | 2 | 2 | 2 |
| Evaluation | Shore A hardness | 71 | 72 | 71 | 77 | 70 | 65 |
|  | 90° peel test — 90° peel strength [N/cm] | 0.3 | 2.3 | 0.2 | 0.4 | 10.2 | 0.2 |
|  | Failure state | Good | Good | Good | Good | Excellent | Good |
|  | Joint gap test [mm] | 0.2 | 0.15 | 0.2 | 0.15 | 0.2 | 0.3 |
|  | Floor squeak test | Good | Good | Good | Good | Good | Good |
|  | Peeling-off test 1 — Peeling-off time [second] | 131 | 187 | 126 | 203 | 320 | 160 |
|  | Peeling-off test 2 | Good | Good | Good | Good | Fail | Fail |

TABLE 2

|  |  | Examples |  |  |  |  |  |  |  |  |
|---|---|---|---|---|---|---|---|---|---|---|
|  |  | 5 | 6 | 7 | 8 | 9 | 10 | 11 | 12 | 13 |
| Formulation (part by weight) | Polyoxypropylene-based polymer (I) | 100 | 100 | 100 | 100 | 100 | 100 | 100 | 100 | 100 |
|  | Heavy calcium carbonate | 100 | 100 | 100 | 0 | 0 | 0 | 100 | 100 | 100 |
|  | Colloidal calcium carbonate | 50 | 50 | 50 | 40 | 30 | 40 | 50 | 50 | 50 |
|  | Silanol condensation catalyst 1 | 2 | 2 | 0 | 2 | 2 | 2 | 2 | 2 | 2 |
|  | Silanol condensation catalyst 2 | 0 | 0 | 2 | 0 | 0 | 0 | 0 | 0 | 0 |
|  | Glass balloon | 0 | 0 | 0 | 0 | 0 | 0 | 0 | 0 | 0 |
|  | Fly ash balloon | 5 | 10 | 20 | 5 | 5 | 5 | 20 | 0 | 0 |
|  | Shirasu balloon | 0 | 0 | 0 | 0 | 0 | 0 | 0 | 5 | 10 |
|  | Flaky talc | 0 | 0 | 0 | 110 | 120 | 110 | 0 | 0 | 0 |
|  | Aminosilane coupling agent | 0 | 0 | 0 | 0 | 0 | 0 | 0 | 0 | 0 |
|  | Epoxysilane coupling agent | 0 | 0 | 0 | 0 | 0 | 2 | 2 | 0 | 0 |
|  | Dehydrating agent | 4 | 4 | 4 | 4 | 4 | 4 | 4 | 4 | 4 |
|  | Hindered phenol-based antioxidant | 2 | 2 | 2 | 2 | 2 | 2 | 2 | 2 | 2 |
| Evaluation | Shore A hardness | 65 | 68 | 69 | 77 | 79 | 77 | 70 | 62 | 65 |
|  | 90° peel test — 90° peel strength [N/cm] | 0.2 | 0.3 | 0.4 | 0.2 | 0.2 | 2.2 | 2.5 | 0.3 | 0.3 |
|  | Failure state | Good | Good | Good | Good | Good | Good | Good | Good | Good |
|  | Joint gap test [mm] | 0.3 | 0.2 | 0.2 | 0.15 | 0.15 | 0.15 | 0.2 | 0.3 | 0.2 |
|  | Floor squeak test | Good | Good | Good | Good | Good | Good | Good | Good | Good |
|  | Peeling-off test 1 — Peeling-off time [second] | 105 | 109 | 110 | 118 | 120 | 170 | 181 | 112 | 115 |
|  | Peeling-off test 2 | Good | Good | Good | Good | Good | Good | Good | Good | Good |

TABLE 3

|  |  | Examples |  |  |  | Comparative Examples |
|---|---|---|---|---|---|---|
|  |  | 14 | 15 | 16 | 17 | 3 |
| Formulation (part by weight) | Polyoxypropylene-based polymer (I) | 100 | 100 | 100 | 100 | 100 |
|  | Heavy calcium carbonate | 100 | 100 | 0 | 0 | 0 |
|  | Colloidal calcium carbonate | 50 | 50 | 40 | 40 | 40 |
|  | Silanol condensation catalyst 1 | 2 | 0 | 2 | 0 | 2 |
|  | Silanol condensation catalyst 2 | 0 | 0 | 0 | 0 | 0 |

TABLE 3-continued

|  |  |  | Examples | | | | Comparative Examples |
|---|---|---|---|---|---|---|---|
|  |  |  | 14 | 15 | 16 | 17 | 3 |
|  | Silanol condensation catalyst 3 |  | 0 | 2 | 0 | 2 | 0 |
|  | Glass balloon |  | 0 | 0 | 0 | 0 | 0 |
|  | Fly ash balloon |  | 0 | 0 | 0 | 0 | 0 |
|  | Shirasu balloon |  | 5 | 5 | 5 | 5 | 0 |
|  | Flaky talc |  | 0 | 0 | 110 | 110 | 110 |
|  | Aminosilane coupling agent |  | 0 | 0 | 0 | 0 | 0 |
|  | Epoxysilane coupling agent |  | 0 | 0 | 0 | 0 | 0 |
|  | Dehydrating agent |  | 4 | 4 | 4 | 4 | 4 |
|  | Reactive diluent |  | 10 | 10 | 20 | 20 | 0 |
|  | Hindered phenol-based antioxidant |  | 2 | 2 | 2 | 2 | 2 |
| Evaluation | Shore A hardness |  | 70 | 75 | 80 | 83 | 70 |
|  | 90° peel test | 90° peel strength [N/cm] | 0.2 | 0.2 | 0.15 | 0.2 | 0.1 |
|  |  | Failure state | Good | Good | Good | Good | Good |
|  | Joint gap test [mm] |  | 0.15 | 0.15 | 0.15 | 0.1 | 0.3 |
|  | Floor squeak test |  | Good | Good | Good | Good | Good |
|  | Peeling-off test 1 | Peeling-off time [second] | 104 | 90 | 95 | 90 | 122 |
|  | Peeling-off test 2 |  | Good | Good | Good | Good | Good |

INDUSTRIAL APPLICABILITY

The adhesive for floor structure of the present invention is suitably used for the formation of the floor structure in which the floor finishing material is adhesively integrated with the sub-floor material.

REFERENCE SIGNS LIST

1 floor base
2 spacer
10 adhesive layer
20 floor finishing material
30 sub-floor material
40 damping complex
41 adhesive
42 base substrate
43 damping sheet

The invention claimed is:

1. An adhesive for floor structure suitable for adhesively integrating a floor finishing material with a sub-floor material laid on a floor base, comprising
    a hydrolyzable silyl group-containing polyoxypropylene-based polymer (I), calcium carbonate, a hollow filler and a reactive diluent,
    wherein the hydrolyzable silyl group-containing polyoxypropylene-based polymer (I) has a viscosity at 25° C. of 1,500 to 100,000 mPa·s, and
    wherein the reactive diluent is a hydrolyzable silyl group-containing polyoxyalkylene-based polymer (II) having a viscosity at 25° C. of 200 to 1,000 mPa·s.

2. The adhesive for floor structure according to claim 1, wherein the polyoxypropylene-based polymer (I) contains no urethane bond.

3. The adhesive for floor structure according to claim 1, comprising a flaky inorganic filler.

4. An adhesive for floor structure suitable for adhesively integrating a floor finishing material with a sub-floor material laid on a floor base, comprising
    a hydrolyzable silyl group-containing polyoxypropylene-based polymer (I), calcium carbonate, a hollow filler and dioctyl bis(triethoxysiloxy)tin.

* * * * *